(12) United States Patent
Wheeler et al.

(10) Patent No.: US 6,749,268 B1
(45) Date of Patent: Jun. 15, 2004

(54) CLOSING APPARATUS FOR TWIN PENDULUM HOPPER DOORS

(76) Inventors: Michael E. Wheeler, 68 Lorena Dr., Oran, MO (US) 63771; Derek L. Wheeler, 11 Oak Meadows, Sikeston, MO (US) 63801

( * ) Notice: Subject to any disclaimer, the term of this patent is extended or adjusted under 35 U.S.C. 154(b) by 7 days.

(21) Appl. No.: 10/184,834

(22) Filed: Jun. 28, 2002

(51) Int. Cl.[7] .................................................. B60P 1/56
(52) U.S. Cl. ...................... 298/35 M; 298/29; 298/30; 298/33
(58) Field of Search ............................ 298/29, 30, 31, 298/33, 35 M; 105/250, 253, 255, 290

(56) References Cited

U.S. PATENT DOCUMENTS

| | | | |
|---|---|---|---|
| 732,348 A | 6/1903 | Harrison | |
| 758,135 A | 4/1904 | Harrison | |
| 2,268,290 A | 12/1941 | Landis | 298/35 |
| 2,539,731 A | 1/1951 | Dixson | 298/30 |
| 2,663,231 A | 12/1953 | Wood | 298/30 |
| 3,217,909 A | 11/1965 | Heise | 298/30 |
| 3,373,700 A | 3/1968 | De Ridder | |
| 3,581,672 A | 6/1971 | Aquino | |
| 3,633,772 A | 1/1972 | Miller | |
| 3,650,221 A | 3/1972 | Nagy | |
| 3,786,764 A | 1/1974 | Beer, Jr. et al. | |
| 3,805,708 A | 4/1974 | Schuller et al. | |
| 3,806,198 A | 4/1974 | Fikse | 298/30 |
| 3,815,514 A | 6/1974 | Heap | |
| 3,868,913 A | 3/1975 | Becker et al. | |
| 3,931,768 A | 1/1976 | Price et al. | |
| 3,966,255 A * | 6/1976 | Licari | 298/35 M |
| 4,284,011 A | 8/1981 | Eagle | |
| 4,326,750 A | 4/1982 | Rosenbaum | 298/35 M |
| 4,688,488 A | 8/1987 | Adams et al. | |
| 4,766,820 A | 8/1988 | Ritter et al. | |
| 5,144,895 A | 9/1992 | Murray | |
| 5,294,186 A * | 3/1994 | DeCap | 298/35 M |
| 5,324,097 A * | 6/1994 | Decap | 298/35 M |
| 6,067,912 A | 5/2000 | Miller | |

* cited by examiner

Primary Examiner—Stephen Gordon
(74) Attorney, Agent, or Firm—Grace J. Fishel

(57) ABSTRACT

A pneumatic closing apparatus suitable for metering grain or other material gravity discharged by twin pendulum hopper doors from a hopper trailer. The closing apparatus includes a bidirectional pneumatic cylinder that operates a linkage assembly controlling the doors and a torsion spring which damps the pneumatic cylinder so that it is possible to meter the grain or other material. The torsion spring also resisting opening of the pendulum doors if the pneumatic cylinder loses pressure.

7 Claims, 5 Drawing Sheets

CLOSING APPARATUS FOR TWIN PENDULUM HOPPER DOORS

BACKGROUND OF THE INVENTION

1. Field of the Invention

The present invention relates to a closing apparatus for twin pendulum hopper doors suitable for metering grain from a hopper trailer.

2. Brief Description of the Prior Art

A hopper trailer is a vehicle designed with one or more dropped hoppers below the trailer body. Each hopper has a bottom discharge opening through which material is gravity discharged. In the case of hopper trailers for use in hauling grain, a closing apparatus making use of pneumatically operated twin pendulum doors has been found effective. While a separate source of pressurized air could be used, it is preferred that the pneumatic system be operated off the vehicle's air brake system where pressures tend to decrease with age of the vehicle. This is a problem for a pneumatic closing apparatus where the doors are closed with an extension spring.

Grain is typically unloaded into an augur or pit. When grain is unloaded from a hopper trailer, the operator may need to stop the flow or to adjust the rate at which the grain is flowing such that the flow of grain does not overrun the augur.

With a pneumatically operated closing apparatus having a spring return, there may not be enough pressure in an older vehicle's air brake system to open the doors against the resistant of a spring stiff enough to close the doors against the flow of grain. Hence a closing apparatus that effectively meters the grain at first may stop working as the vehicle ages.

BRIEF SUMMARY OF THE INVENTION

In view of the above, it is an object of the present invention to provide a compressed air closing apparatus for twin pendulum hopper doors wherein the discharge of material in the hopper can be regulated and accurately metered by the doors. It is another object to provide a compressed air closing apparatus whose performance is not substantially affected by a decline in available air pressure. Other objects and features of the invention will be in part apparent and in part pointed out hereinafter.

In accordance with the invention, a door closing apparatus is provided for a hopper with a bottom discharge opening for discharging material therefrom and first and second pendulum doors connected to the hopper that are moveable between a closed position preventing discharge of material from the hopper through the bottom discharge opening and an open position allowing discharge of material from the hopper through the bottom discharge opening. A framework is provided in the discharge opening for supporting the door closing apparatus.

The door closing apparatus has a first gear wheel mounted on a first shaft and a second gear wheel mounted on a second shaft, with the first and second shafts journaled in the framework in the discharge opening and with the first and second gear wheels having teeth in mesh. A torsion spring having first and second spring arms and an initial tension is attached by the first spring arm to one of said first or second shafts and the second spring arm is stopped from rotation by the framework.

A first crank arm is attached to the first gear wheel and a second crank arm is attached to the second gear wheel, with each of the first and second crank arms having a free end. A lever arm with a free end is attached to one of the first or second crank arms.

A first connecting link is pivotally attached to the free end of the first crank arm and pivotally attached to the first pendulum door and a second connecting link is pivotally attached to the end of the second crank arm and pivotally attached to a second pendulum door. The first and second crank arms are generally oppositely directed when the pendulum doors are in a closed position and are generally parallel when the pendulum doors are in an open position.

A bidirectional pneumatic cylinder with a piston rod for connection with a source of pressurized air is pivotally attached to the framework above the first and second gear wheels. The piston rod is pivotally attached to the free end of the lever arm.

In operation, the initial tension of the torsion spring damps movement of the pendulum doors by the pneumatic cylinder and resists opening of the pendulum doors if the pneumatic cylinder loses pressure.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
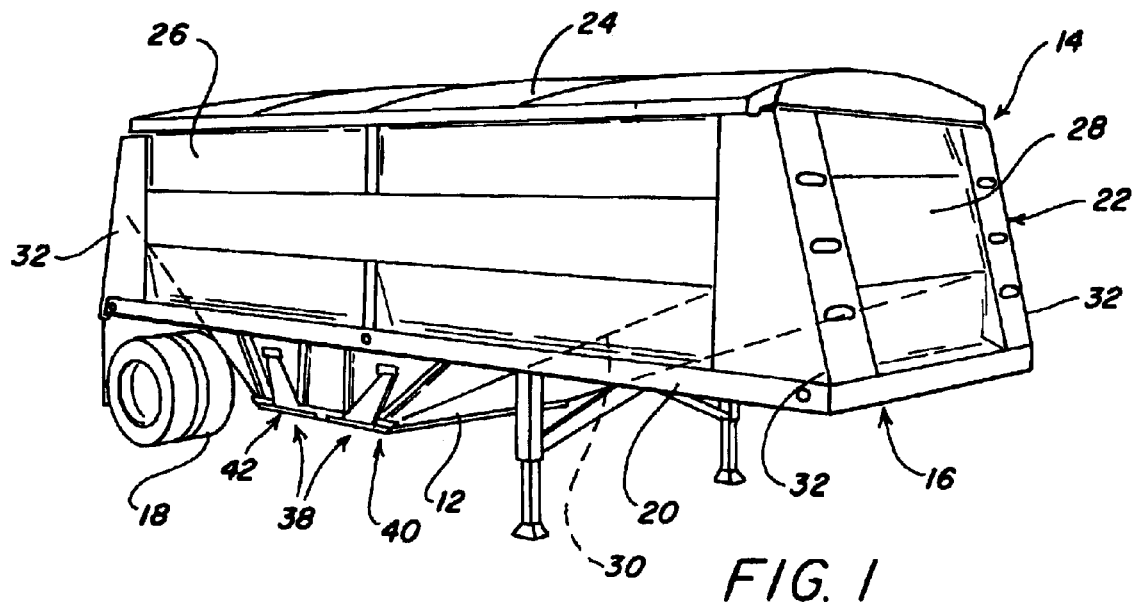
FIG. 1 is a perspective view of a hopper trailer with a hopper having a bottom discharge opening.

Referring to the drawings more particularly by reference character, reference numeral 10 refers to a door closing apparatus for a hopper 12 on a hopper trailer. 14 in accordance with the present invention. The term hopper trailer 14 includes hopper type trailers, semi-trailers, wagons and similar material handling vehicles having a hopper bottom through which the entire load is discharged by gravity. In the example shown in FIG. 1, hopper trailer 14 has a chassis frame 16 mounted at its rear portion upon ground wheels 18 and at its forward end provided with a suitable coupling means for connection upon the rear portion of a truck chassis. Chassis frame 16 has side sills 20 upon which is mounted a body portion 22 over which may be provided a canvas top 24. Body portion 22 is formed with vertical side walls 26, end walls 28, and a floor 30 which slopes toward hopper 12, all supported by corner posts 32.

Figure 2:
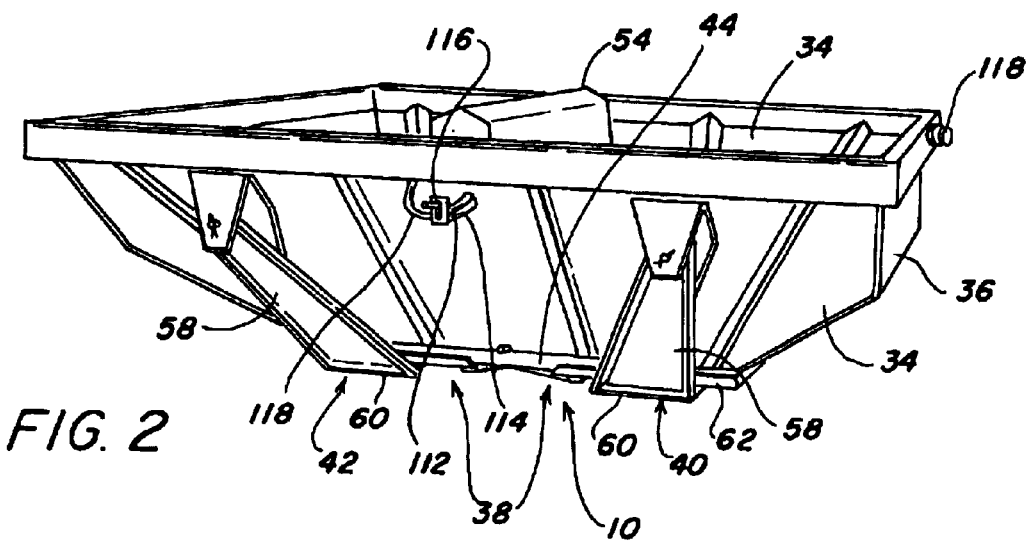
FIG. 2 is a perspective view of a hopper having twin pendulum doors outfitted with a door closing apparatus in accordance with the present invention.

Hopper 12 depends between side sills 20 from hopper trailer 14. As seen in FIG. 2, hopper 12 has side walls 34 which extend in downwardly converging relation from the lower ends of vertical side walls 26, while end walls 36 of hopper 12 extend vertically downward from the included floor portion 30 and then slope in downwardly converging relation. The straight lower edges of hopper walls 34, 36 align on a horizontal plane and form a rectangular bottom discharge opening 38 adapted to be closed by first and second pendulum doors 40, 42. Discharge opening 38 is framed with a rectangular rim 44 in which is mounted a brace assembly 46 including first and second generally parallel transverse braces 48 interconnected by tour shorter, longitudinal braces, grouped as outer pair 50 and inner pair 52. Mounted over brace assembly 46 is a housing 54, which as illustrated is generally A-shaped in cross section. Brace assembly 46 and housing 54 make up a. framework 56 for use as more particularly described below.

Referring now to the construction and manner of suspending twin pendulum hopper doors 40, 42 for closing hopper discharge opening 38, each of doors 40, 42 is of like construction and is generally U-shaped with legs 58 joined by a bight 60 supporting a flat plate 62, the underside of which may include reinforcing ribs 64. Pendulum hopper doors 40, 42 are pendently hung by legs 58 from opposite ends of hopper 12 on parallel axes 66, 68 extending transverse of hopper trailer 14 and are arranged for simultaneous opposite outward swinging by door closing apparatus 10 from a closed position into an open position allowing the discharge of material from hopper 12 through bottom discharge opening 38. In starting, closed position, a leading edge of flat plates 62 meet brace assembly 46 of framework 56 for closing bottom discharge opening 38.

Door closing apparatus 10, details of which are best seen in FIGS. 5–8, includes first and second toothed gear wheels 70, 72, a sector 74 of which is used. As illustrated, gear wheels 70, 72 have equal diameters and are encircled by equal numbers of teeth. It will be understood that the term "toothed gear wheels" includes segmental gear wheels having an arcuate sector of teeth as a complete circle of teeth is not required.

First and second gear wheels 70, 72 are mounted on first and second shafts 76, 78, respectively, which are journaled between pairs of inner and outer longitudinal braces 50, 52 in suitable bearings 80. As shown in the drawings, first and second gear wheels 70, 72 are positioned between inner braces 52 with the gear teeth in mesh so that the gears rotate in opposite directions.

A torsion spring 82 with first and second spring arms 84, 86, respectively, encircles one of shafts 76, 78, illustrated in the drawings, as first shaft 76. Torsion spring 82 has an initial tension which must be overcome before the coils of the spring can be unwound. First spring arm 84 is received in an eye bolt 30 88 attached to a cross brace 90 between adjacent outer and inner transverse braces 50, 52 and thereby stopped from rotation with first shaft 76.

A first crank arm 92 is attached to first gear wheel 70 and a second crank arm 94 is attached to second gear wheel 72. Each of crank arms 92, 94 has a free end. A lever arm 96 with a free end is attached to one of first and second crank arms 92, 94, illustrated in the drawings as first crank arm 92. A first connecting link 98 is pivotally attached to the free end of first crank arm 92 through a first bracket 100 and pivotally attached to a lower end of first pendulum door 40 by a second bracket 102. In like manner, a second connecting link 104 is pivotally attached to the free of second crank arm 94 and pivotally attached to a lower end of second pendulum door 42 by first and second brackets 100, 102. First and second connecting links 98, 104 may be threadably adjustable in length in first bracket 100 or the like.

A bidirectional pneumatic cylinder 106 with a piston rod 108 is pivotally attached to the inside of housing 54 above first and second gear wheels 70, 72. Piston rod 108 is pivotally attached with a pivot clevis 110 to the free end of lever arm 96. Cylinder 106 is connected to first and second conduits 112, 114 through a valve control means 116 which may be located on hopper 12 or remotely such as in the cab of the truck tractor towing hopper trailer 14. A source of pressurized air is supplied to valve control means 116 by a third conduit 118. While a separate source of pressurized air could be used, it is preferred that the source of pressurized air be supplied through a series of additional or auxiliary air lines connected to the source of pressure for the towing vehicle's air brake system. Valve control means 116 directs the flow of air through first and second conduits 11 2, 114 such that piston rod 108 is reciprocated by cylinder 106. Valve control means 116 has a neutral position where additional air is supplied to neither first nor second conduits 112, 114, fixing twin pendulum doors 40, 42 in a selected position.

Figure 3:
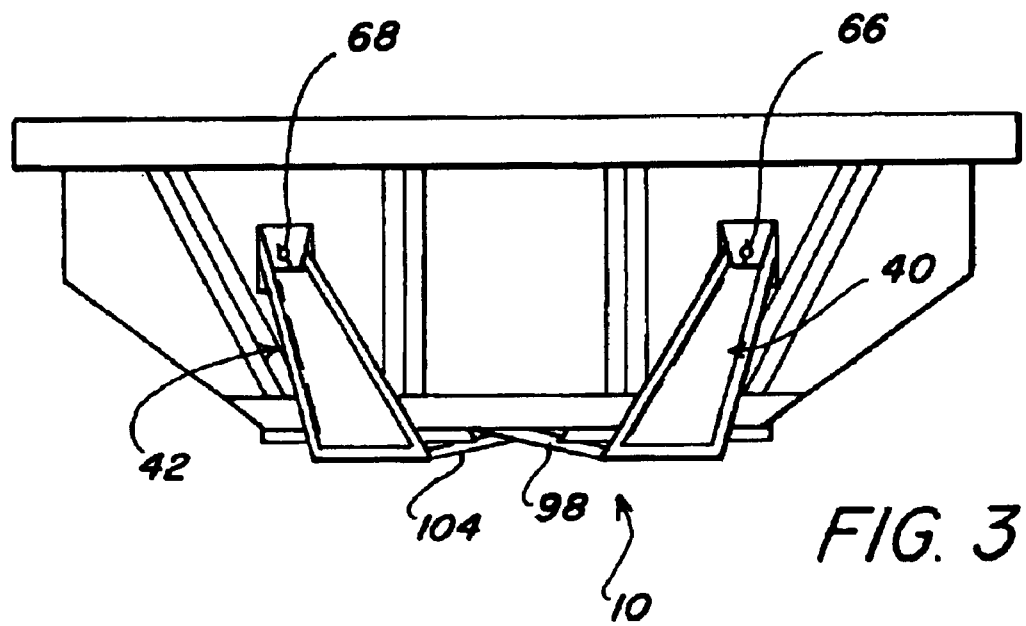
FIG. 3 is a side elevation of the hopper with the twin pendulum doors in closed position.
Figure 4:
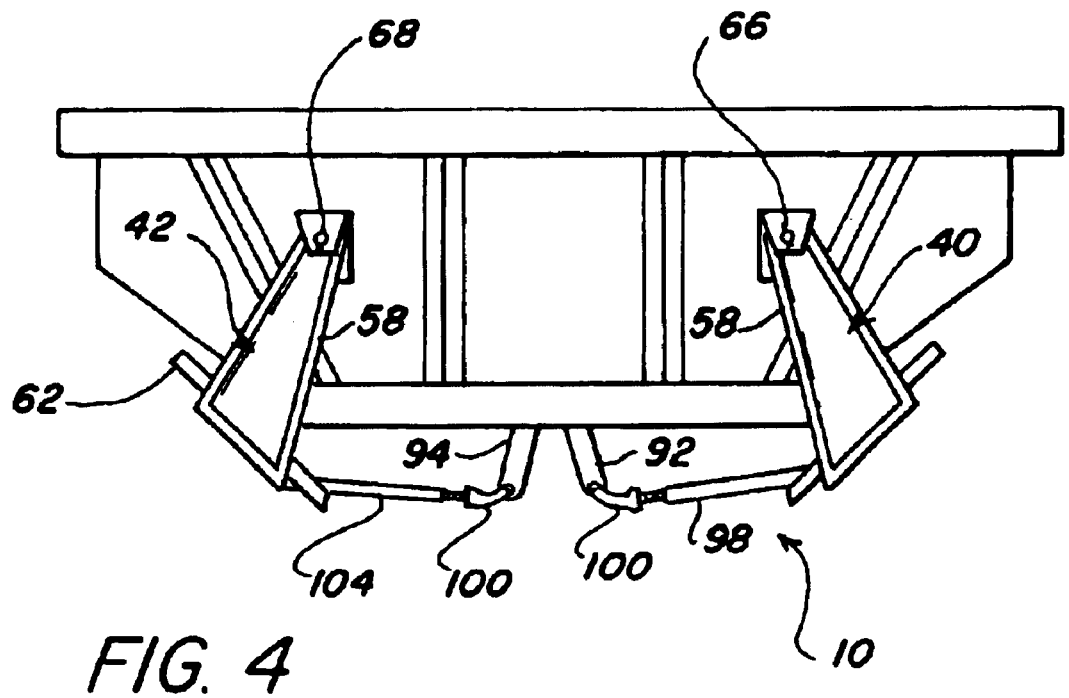
FIG. 4 is a side elevation of the hopper with the twin pendulum doors in open position.
Figure 5:
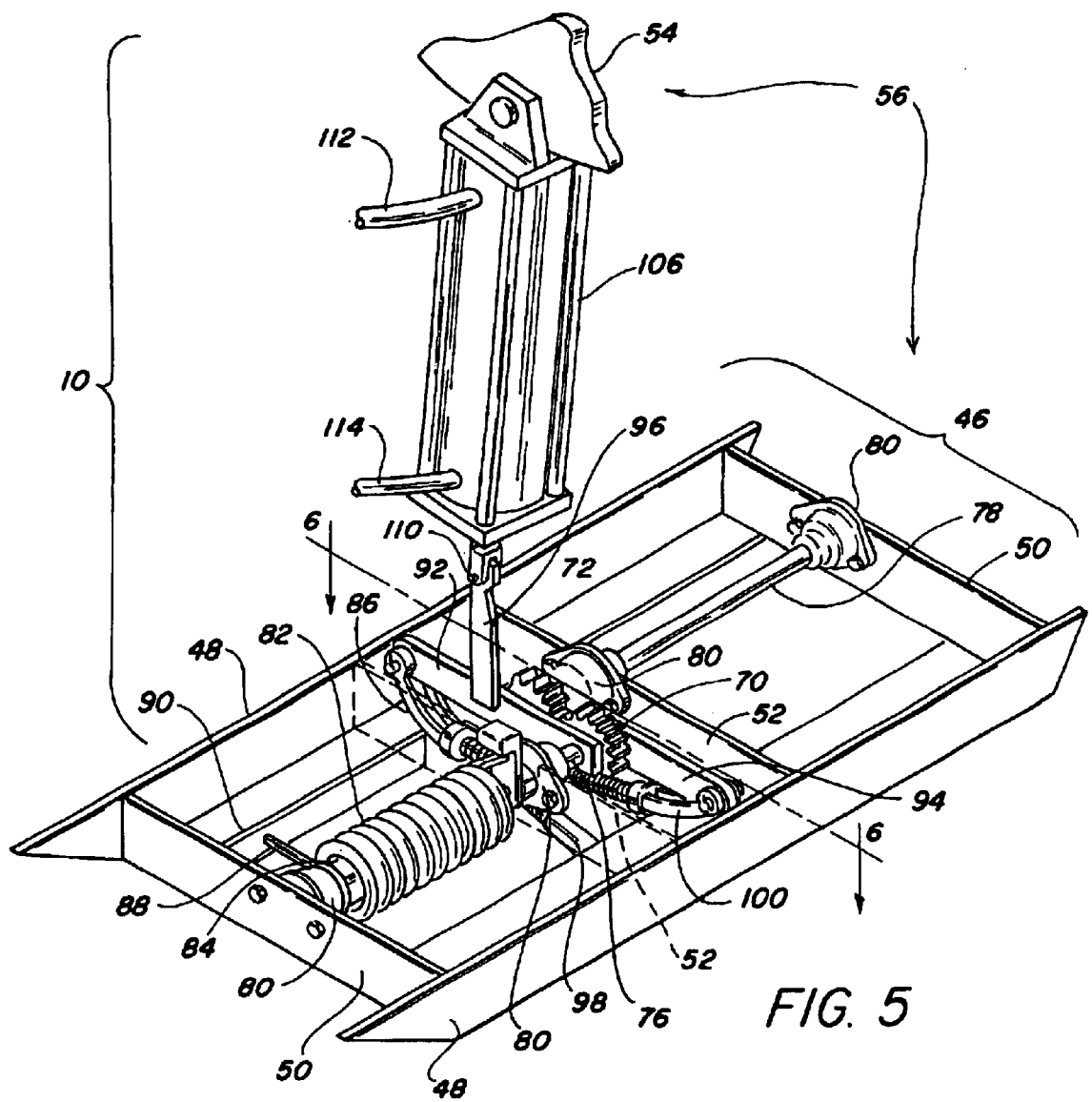
FIG. 5 is a perspective view on an enlarged scale of the door closing apparatus.
Figure 6:
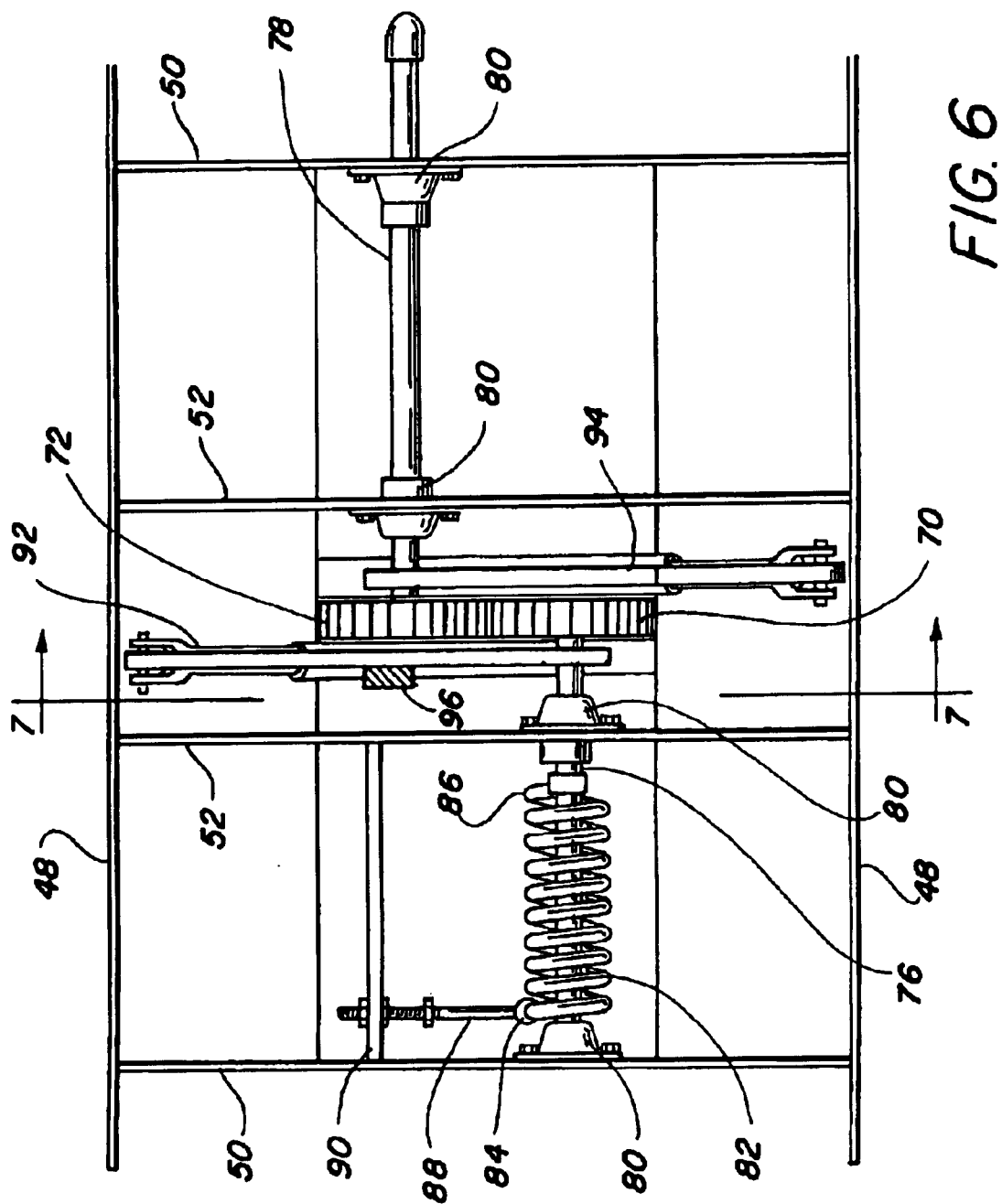
FIG. 6 is a section taken along the plane of 6—6 in FIG. 5.
Figure 7:
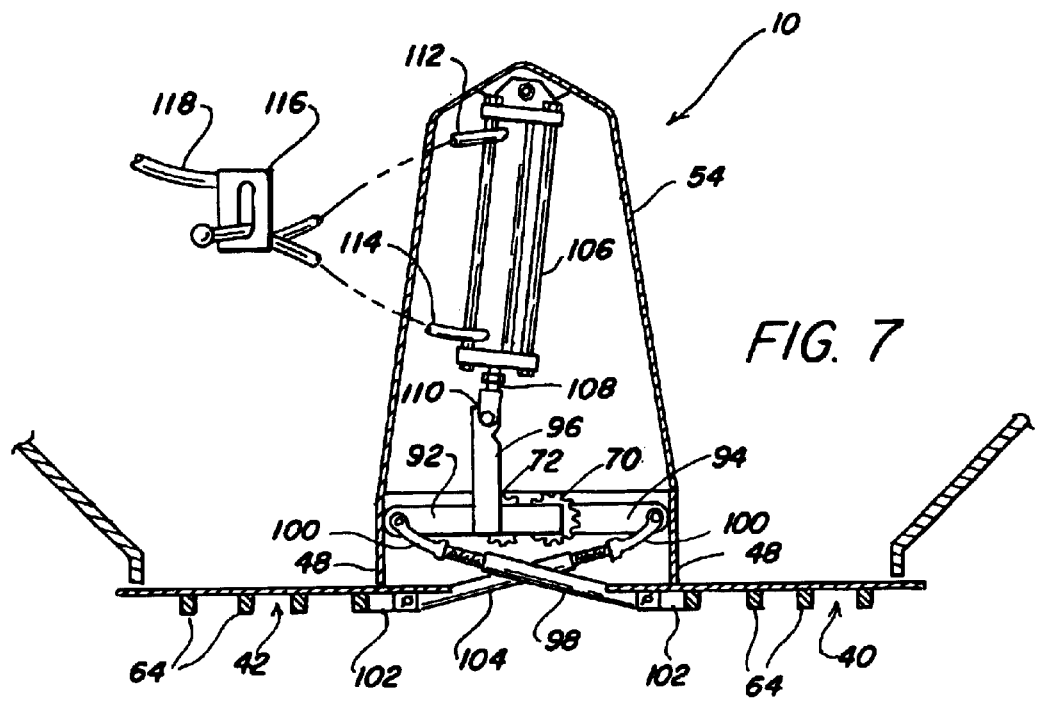
FIG. 7 is a section taken along the plane of 7—7 in FIG. 6.
Figure 8:
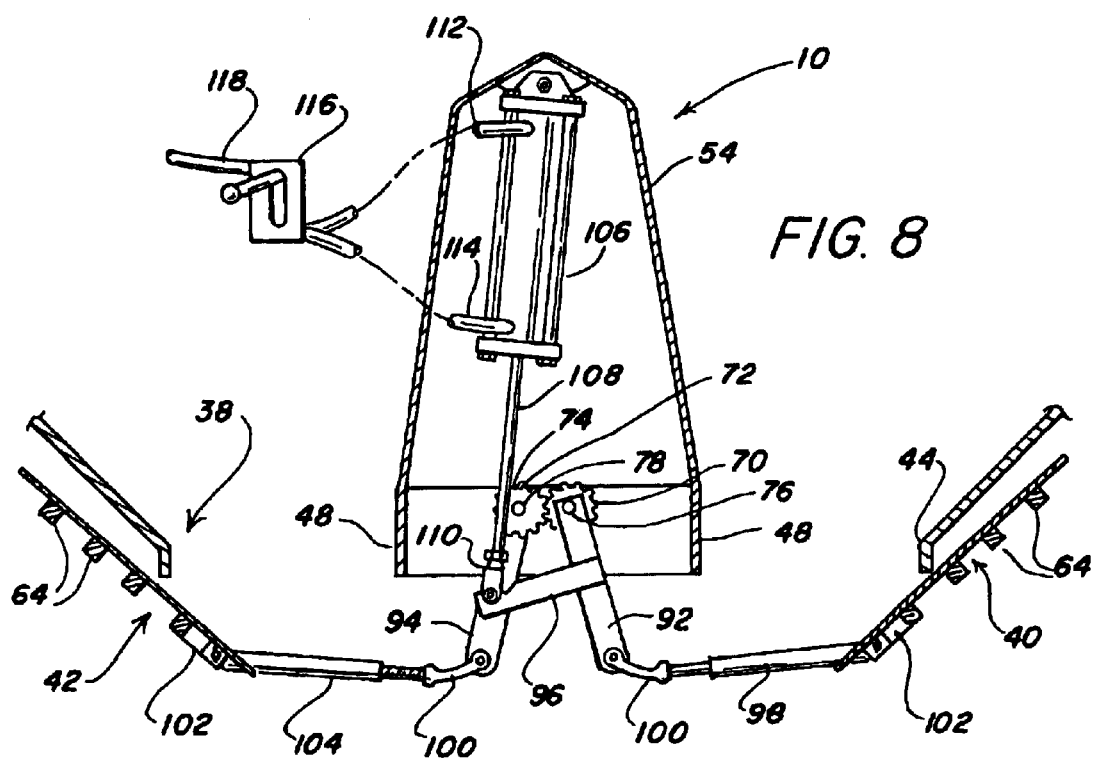
FIG. 8 is a view similar to FIG. 7 but with the twin pendulum doors in full open position.

Bidirectional pneumatic cylinder 106 operates the linkage assembly including first and second gear wheels 70, 72, first and second crank arms 92, 93, and first and second connecting links 98, 104 through lever arm 96. When twin pendulum doors 40, 42 are in closed position preventing discharge of material from hopper 12 through bottom discharge opening 38 as shown in FIGS. 3 and 7, piston rod 108 is retracted and first and second crank arms 92, 94 are generally oppositely directed. As piston rod 108 is extended, lever arm 96 presses first crank arm 92 downwardly causing first and second gear wheels 70, 72 to rotate after the initial tension of torsion spring 82 is overcome. Then as first and second crank arms 92, 94 are brought into generally parallel relationship as shown in FIGS. 4 and 8, connecting links 98, 104 unfold pushing twin pendulum doors 40, 42 into full open position.

The initial pressure applied by torsion spring 82 resists opening of the pendulum doors if pneumatic cylinder 106 loses pressure. The pressure applied by torsion spring 82 also damps pneumatic cylinder 106 so that it is possible to meter the grain flowing through bottom discharge opening 38 by accurately controlling the position of twin pendulum doors. In the absence of torsion spring 82, pneumatic cylinder 106 has a springiness that makes it difficult to accurately control the doors as is possible with a hydraulic cylinder, but a pneumatic cylinder is preferred for use on hopper trailer 14 for hauling grain because there is an on-board source of pressurized air in the towing vehicle. Since torsion spring 82 is not required for closing twin pendulum doors 40, 42 and unlike prior art constructions, the spring need not be highly stiff so that even as the vehicle ages and the available air pressure decreases, there is sufficient pressure for door closing apparatus 10 to accurately position the doors and meter the grain.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A door closing apparatus for a hopper with a bottom discharge opening for discharging material therefrom and first and second pendulum doors connected to the hopper and moveable between a closed position preventing discharge of material from the hopper through the bottom discharge opening and an open position allowing discharge of material from the hopper through the bottom discharge opening, a framework in the discharge opening, said door closing apparatus comprising:

a first gear wheel mounted on a first shaft and a second gear wheel mounted on a second shaft, said first and second shafts journaled in the framework in the discharge opening and said first and second gear wheels having teeth in mesh, a torsion spring having first and second spring arms and an initial tension, said first spring arm attached to one of said first or second shafts and said second spring arm stopped from rotation by the framework, a first crank arm attached to the first gear wheel and a second crank arm attached to the second gear wheel, each of said first and second crank arms having a free end, a lever arm with a free end, said lever arm attached to one of the first or second crank arms, a first connecting link pivotally attached to the free end of the first crank arm and pivotally attached to the first pendulum door and a second connecting link pivotally attached to the end of the second crank arm and pivotally attached to the second pendulum door, said first and second crank arms generally oppositely directed when the pendulum doors are in the closed position and generally parallel when the pendulum doors are in said open position, a bidirectional pneumatic cylinder with a piston rod for connection with a source of pressurized air, said cylinder pivotally attached to the framework above the first and second gear wheels, said piston rod pivotally attached to the free end of the lever arm, whereby the initial tension of the torsion spring damps movement of the pendulum doors by the pneumatic cylinder and resists opening of the pendulum doors if the pneumatic cylinder loses pressure.

2. The door closing apparatus of claim 1 wherein the framework includes a pair of transverse braces in the discharge opening joined by an inner and an outer pair of longitudinal braces, said first and second shafts journaled in an adjacent inner and outer one of said longitudinal braces with the first and second gear wheels between the inner longitudinal braces.

3. The door closing apparatus of claim 2 wherein the torsion spring encircles said one of said first and second shafts between an inner and one outer of said longitudinal braces and said second spring arm is attached to said one of said first or second shafts by a bracket.

4. The door closing apparatus of claim 1 wherein a housing is mounted on said transverse braces above the first and second gear wheels and wherein the bidirectional pneumatic cylinder is attached to the inside of the housing.

5. The door closing apparatus of claim 4 wherein first and second air supply conduits are connected to the bidirectional pneumatic cylinder, said first and second air supply conduits connected through a valve control means to a third air supply conduit for connection to the source of pressurized air.

6. The door closing apparatus of claim 5 wherein the valve control means can selectively direct the flow of air through the first or second conduits and has a neutral position where additional air is supplied to neither the first nor second conduits.

7. A door closing apparatus for a hopper with a bottom discharge opening for discharging material therefrom and first and second pendulum doors connected to the hopper and moveable between a closed position preventing discharge of material from the hopper through the bottom discharge opening and an open position allowing discharge of material from the hopper through the bottom discharge opening, said door closing apparatus comprising a bidirectional pneumatic cylinder that operates a linkage assembly including first and second links for controlling the first and second pendulum doors and a torsion spring biasing at least one of the first and second connecting links towards the closed position, said torsion spring dampening the pneumatic cylinder so that it is possible to meter the material discharged through the bottom discharge opening.

* * * * *